Aug. 8, 1961

H. BRANDT 2,995,207

DUST SEPARATOR

Filed July 9, 1959

3 Sheets-Sheet 1

Inventor:
HERBERT BRANDT
BY C. P. Goepel
his ATTORNEY

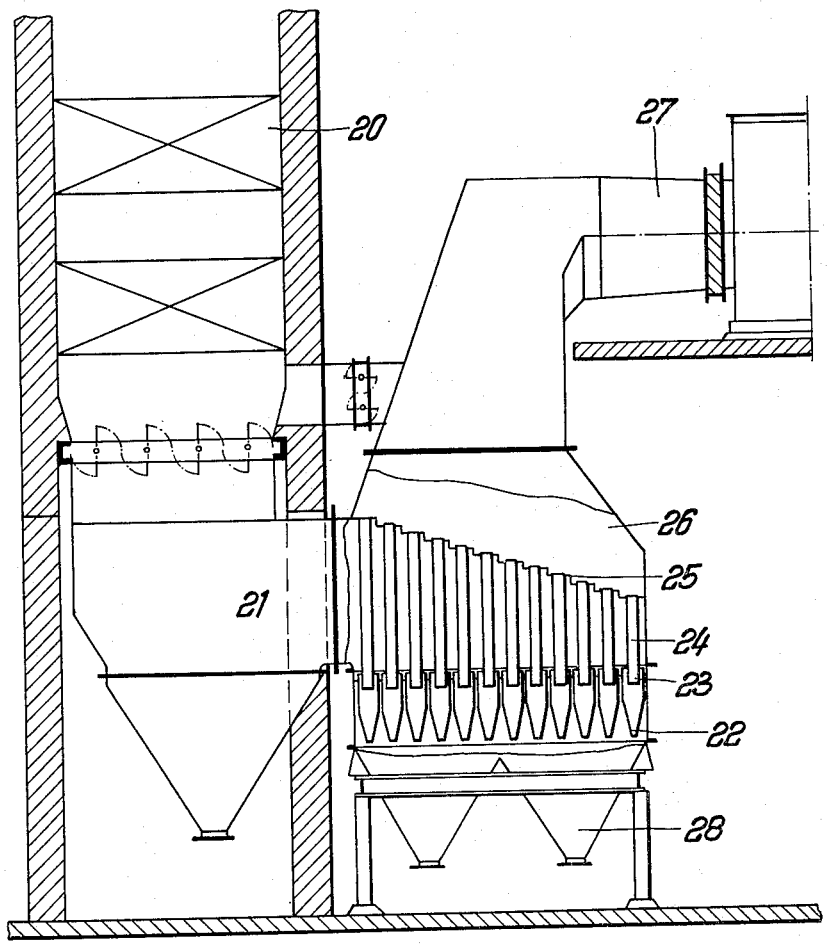

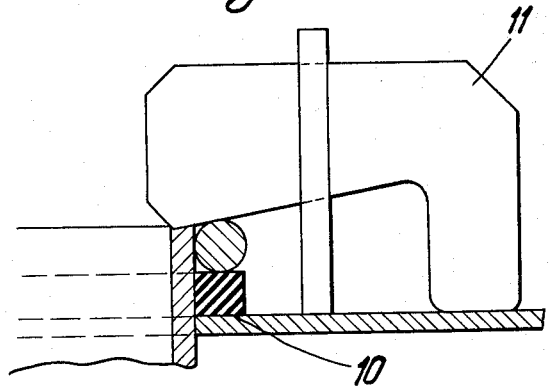
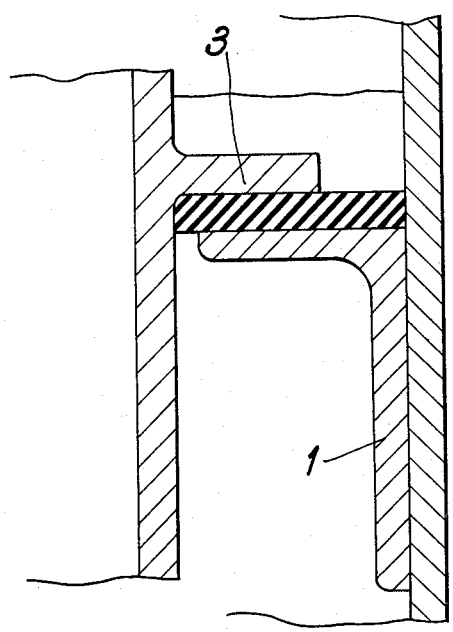

United States Patent Office 2,995,207
Patented Aug. 8, 1961

2,995,207
DUST SEPARATOR
Herbert Brandt, Rothemuhle uber Olpe,
Westphalia, Germany
Filed July 9, 1959, Ser. No. 825,966
Claims priority, application Union of South Africa
July 9, 1958
2 Claims. (Cl. 183—81)

The principle of separation of solid or liquid particles from gases by making use of centrifugal forces has been known since the last century. The physical laws of centrifugal force have further taught that separation is more perfect the smaller the diameter on which the centrifugal force works.

This knowledge has brought it about that the large dust separator cyclones as originally employed were abandoned to be replaced by a multitude of smaller cyclones.

This development had the disadvantage that the separation effect of the small cyclones was usually not satisfactory, that the small cyclones were particularly subject to wear and tear, and that the manufacture of small cyclones was more expensive than that of large cyclones working the same gas quantity. The reason for the diminished separation effect was found to lie in the mutual interference of the small cyclones.

An object of the present invention is to overcome these disadvantages.

Figure 2:
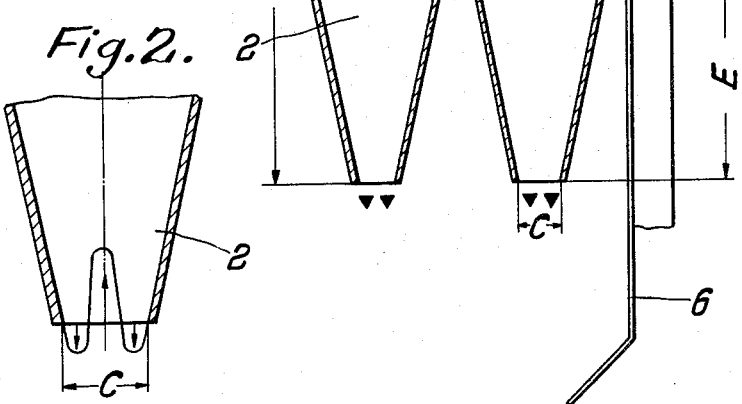

In extensive and detailed tests the causes and their removal were unambiguously clarified and a construction of a multi-cell dust separator was effected which could be relied upon for bringing about an effective dust separation, without being subject to wear and tear, and being cheap in mass production. The test resulted in the realization of the principle that certain geometrical ratios of measurements are necessary for the multi-cell dust separator to bring about a satisfactory separation effect without wear and tear. The necessity of keeping to such geometrical ratios, springs from kinetic processes in the cells as well as in the communicating openings from the cells to the dust hopper. In these communication openings a characteristic flow takes place which is shown in FIG. 2. In an annular space a small quantity of dust-laden gas flows in a rotating movement and at very high speeds from the separator cells 2 into the dust hopper 6 whilst in the centre of this opening dust starved gas flows back in a rotating movement and mixes with the gas vortex out through the clean gas pipe.

A certain diameter is needed for the exit opening so that flowing processes can proceed with the desired effect. If the diameter of this opening is too large the axial components of the speeds of the outflow and inflow become too low. This would result in a gas flow from one place affected by a great quantity of gas to a place affected by only a small gas quantity. This gas flow would spoil the favourable separation effect and prior to the invention this was the cause of much disappointment with regard to multicell dust separators. A certain and not too large passage opening is needed if a diminution of the separation effect is to be avoided. The correct effectiveness of the outlet passage opening can be gauged from the negative pressure in the dust hopper 6 which should be lower by about 1″ water column than in the clean gas pipe 9 provided that the other measurements of the multi-cell dust separator are according to the invention.

If, on the other hand, the opening of the passage for the outgoing dust is kept too small, the speeds of the outflow and return-flow of the gases become too great resulting in wear and tear at the passage opening. Too small an opening, moreover, would hinder a sufficiently free passage of the separated dust accumulating in the conical part of the cell and would result in increased quantities of dust which when set into rotation by the rotary motion of the gases, would eat through the partition walls in the conical parts.

The size of the diameter C of the passage for the outgoing dust also depends on the size of the diameter B of the clean gas pipe 5 and the length F of the immersed part of the pure gas pipe.

The correct proportioning of these two measurements of the clean gas pipe is of importance for the formation of the vortex in the cell. It should be intensive enough to cause dust entering the cells 2 with the backflowing gas to be whirled up anew in the lower part of the vortex and again to be carried to the opening of the dust passage by the flow rotations around the vortex so that the purified gas flows off through the clean gas pipe with a very inconsiderable and unavoidable dust content.

Of further importance for the correctly coordinated functioning of these described flow processes is the correct proportioning of the diameter A, of the cylindrical length D—E and of the conical length E of the encasing raw gas pipe 2.

The requirements of the correct proportioning are met if the following ratio of measurement is adopted: Diameter A of the raw gas pipe 2 to diameter B of the clean gas pipe 5 to diameter C of the dust exit passage opening to the overall length D of the cell 2 to the conical length E of the cell 2 to the immersion depth F of the clean gas pipe 5 under the spinners 4 should be as 10″:6″:3″:35″ and 16″:8″.

The sizes of the said measurements have been proved economical and appropriate. A favourable separation effect without wear and tear, however, is also achieved if any other sizes are adopted as long as the ratio remains the same as shown above. Variations in the diameter sizes up to 10%, and of the lengths up to 25% both ways are admissible with variations in the separation effect and absence of wear and tear still remaining reasonable.

Figure 1:
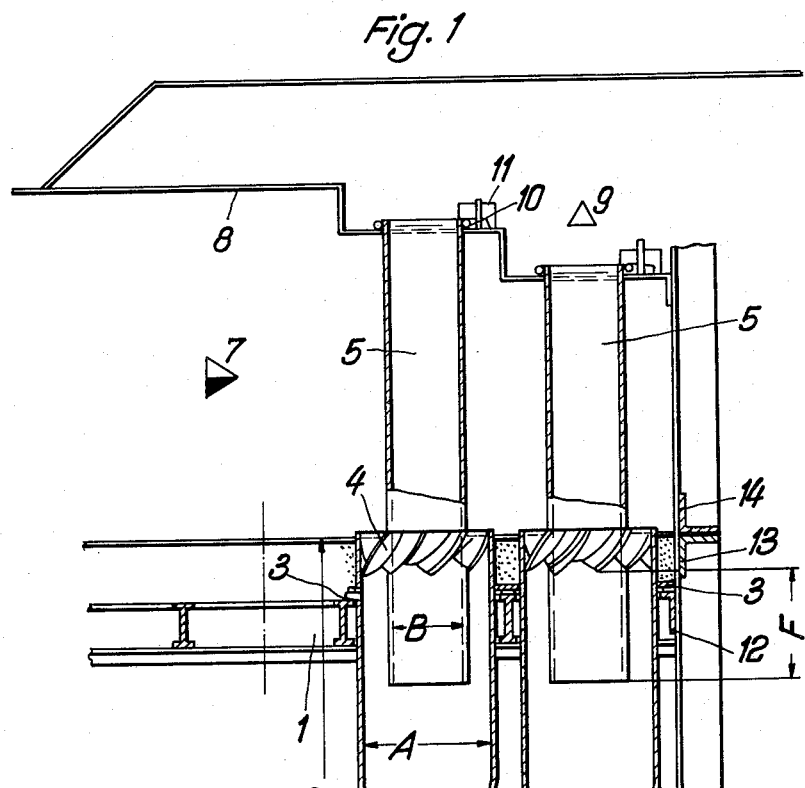

In FIG. 1 an example is depicted of the construction of a multi-cell dust separator according to the invention. The sketch shows a section containing two of the many cells.

FIG. 2 shows the velocity diagram of the axial components of this flow in the passage C. It can be seen that in the centre of the passage the flow is directed into the cell, whereas in the annular space around it is directed from the cell to the dust hopper.

The correct adjustment of this flow which, according to the invention, is achieved by means of the correct proportioning of this passage C to the measurements of the dust separator, is decisive for the separating effect and for the absence of wear and tear under the usually prevailing working conditions.

FIG. 3 is a sketch of a complete dust separator behind a steam boiler. 20 is part of the steam boiler, 21 the raw gas passage into the dust separator, 22 the cells of the dust separator, 23 the spinners and 24 the clean gas pipe fastened to the diaphragm plate 25.

The clean gas passage 26 leads upwards to an axial induced draught fan 27. Dust is collected in the dust hopper 28 of the upper part of which encloses the cells in a closed casing.

FIG. 4 and FIG. 5 are enlarged views of the means for supporting the clean gas pipes and the separator cells respectively.

The cells, according to the invention, are mounted on a supporting construction 1 and are supported by flanges. In the upper opening of the cell there are spinners through which the clean gas pipes 5 lead out of the cells.

The cells are cased in by a sheet iron box 6 which is joined to the supporting construction 1 and which in its lower part serves to receive the separated dust. The raw gas passage 7 joins with the casing 6 of the dust hopper the clean gas passage being separated from the raw gas passage 7 leading outside by means of a diaphragm plate. Each clean gas pipe 5 is joined to the diaphragm plate 8 in a gasproof way according to the invention by making use of three uniformly spaced wedges 11 so that by this joining the packing rings 10 are pressed to the diaphragm plate on three points to ensure a uniform gas-tight joint.

To seal off the raw gas pipes 7 from the dust hopper 6 at the flanges 3 of the cells 2, a gasket made of sealing material 12, such as asbestos, is inserted between the flanges 3 and the supporting construction 1 with a special sort of putty 13 of a thickness of ½" to 1" spread over the flanges. This special sort of putty is of such quality as to preserve its consistency and elasticity under prevalent working conditions and temperature fluctuations. This method of sealing according to the invention aided by the deposit of dust 14 on the layer of putty to the upper lip of the cell makes fastening of the cells 2 to the supporting construction 1 by means of screwing superfluous. This facilitates replacements when the end of durability is reached or in case of breakages of single parts.

Such replacements are facilitated likewise by the manner in which the clean gas pipes 5 in the diaphragm plate 8 are fastened by means of the packing rings 10 made of asbestos or similar material and by means of the wedges 11. After loosening the wedges 11 the clean gas pipes can be pulled upwards into the clean gas passage 9. Then the spinners 4 can be removed, and after removing the sealing putty the cells 2 can be taken out through the raw gas passage and new components can be built in the reverse order.

The cells 2 according to the invention are made of unmachined cast iron which allows mass production at low cost and which renders them resistant to wear and tear when such wear and tear is of necessity experienced if the separated dust is not removed from the dust hopper 6 and accumulates in the cells 2. Such dust if allowed to accumulate causes wear on the walls as it substantially consists of coarser particles, whereas the minute particles are carried along by the gas through the clean gas pipe 5.

The measurements, the geometrical proportions of which have to be adhered to according to the invention are shown in FIG. 1.

The flow-through of the gases to be purified and the separation of the dust proceeds in the manner described hereunder:

The dust-laden gases enter through the raw gas passage 7 into the dust separator and flow around and outside of the clean gas pipes 5 to the spinners 4 in which they are given a strong rotating movement. The gases fill the interior of the cells 2 and a strongly rotating flow is steered upwards in the cell where the purified gases leave the dust separator through the clean gas pipes 5 and the clean gas exit passage 9. With the rotation of the gas the dust is flung to the outer side by centrifugal force and will move downward in a helical path towards the dust exit passage C through which the dust will find its way into the dust hopper 6. The dust removal to and through the passage C is influenced by the flow conditions in the cell. The rotating flow is directed on the outer side from top to bottom and on the inner side from bottom to top. This flow, directed again towards the top and called the vortex, is provided with very considerable tangential and axial speeds in the centre of the flow. This results in a strong suction, like that in a whirlwind which causes a flow of gases from the dust hopper 6 through the passage C into the cell 2. As the gas quantity sucked from the dust hopper 6 must be replaced, an outflowing quantity of gas circles around the inflowing quantity of gas carrying the dust from the cell 2 through the passage C into the dust hopper 6.

What I claim is:

1. A multi-cyclone separator comprising, in combination, a housing; a pair of diaphragms extending through said housing spaced in vertical direction from each other and dividing said housing into an upper chamber, an intermediate chamber, and a lower dust-collecting chamber; a plurality of parallel connected cyclone type separators enclosed in said housing and each comprising an integral outer substantially vertically arranged raw gas tube of substantially uniform wall thickness having an upper inlet opening communicating with said intermediate chamber and a lower outlet opening communicating with said lower dust-collecting chamber, each of said raw gas tubes extending from the lower of the diaphragms into said lower dust-collecting chamber and having each an upper cylindrical portion and a lower frustoconical portion, a clean gas tube coaxially arranged in said raw gas tube and having an upper open end communicating with said upper chamber, said clean gas tube extending from the upper of said diaphragms through said intermediate chamber downwardly into said raw gas tube the ratio of the diameter of said raw gas tube at said inlet opening to the diameter of said outlet opening to the diameter of said clean gas tube being substantially 10:3:6, and vane means in said inlet opening of said raw gas tube in the space between said raw gas tube and said clean gas tube for imparting to a gas flowing through said inlet opening a rotary motion so that particles suspended in the gas will be separated therefrom by centrifugal action and fall through said outlet opening into said dust-collecting chamber while clean gas will rise through said clean gas tubes into said upper chamber; first channel means for feeding raw gas into said intermediate chamber; second channel means for guiding clean gas out of said upper chamber; and suction means communicating with said upper chamber for producing a pressure drop of about 1" water gauge between said upper and said lower chambers, whereby the gas flow through said arrangement will be such as to produce substantially complete separation of solid particles from the gas while reducing abrasive action of the particles on the separators to a minimum.

2. An arrangement as defined in claim 1 in which said lower diaphragm is formed with a plurality of openings through which said raw gas tubes respectively extend and in which each of said raw gas tubes is formed slightly below the upper end thereof with an annular flange extending substantially normal to the tube axis, and including a plurality of annular sealing means respectively sandwiched between said annular flanges and said lower diaphragm so that said raw gas tubes are held by their own weight sealingly connected to said lower diaphragm, said raw gas tubes projecting with their upper ends slightly above said lower diaphragm so that any dust collecting above said flanges will form an additional seal between said raw gas tubes and said lower diaphragm.

References Cited in the file of this patent

UNITED STATES PATENTS

| | | |
|---|---|---|
| 2,433,774 | Madely | Dec. 30, 1947 |
| 2,438,827 | Shoffner | Mar. 30, 1948 |
| 2,521,380 | Lichtenfels | Sept. 5, 1950 |
| 2,544,395 | Polk | Mar. 6, 1951 |
| 2,765,918 | Fontein et al. | Oct. 9, 1956 |